US008616694B2

(12) United States Patent
Kagata et al.

(10) Patent No.: US 8,616,694 B2
(45) Date of Patent: Dec. 31, 2013

(54) INK JET RECORDING METHOD, AND RECORD MADE BY THE SAME

(75) Inventors: Takayoshi Kagata, Shiojiri (JP); Tsuyoshi Sano, Shiojiri (JP); Shiki Hirata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 13/107,339

(22) Filed: May 13, 2011

(65) Prior Publication Data

US 2011/0279611 A1 Nov. 17, 2011

(30) Foreign Application Priority Data

May 14, 2010 (JP) ................................ 2010-111822
Feb. 4, 2011 (JP) ................................ 2011-023012

(51) Int. Cl.
*C09D 11/00* (2006.01)

(52) U.S. Cl.
USPC ........................................................ 347/100

(58) Field of Classification Search
CPC ...................................................... C09D 11/00
USPC ........................................................ 347/100
See application file for complete search history.

(56) References Cited

U.S. PATENT DOCUMENTS

| | | | | |
|---|---|---|---|---|
| 7,763,108 | B2 | 7/2010 | Oyanagi et al. | |
| 2002/0196322 | A1* | 12/2002 | Fujii et al. | 347/105 |
| 2005/0214480 | A1 | 9/2005 | Garbar et al. | |
| 2005/0215689 | A1 | 9/2005 | Garbar et al. | |
| 2006/0044382 | A1 | 3/2006 | Guan et al. | |
| 2006/0098069 | A1 | 5/2006 | Cornell et al. | |
| 2007/0105979 | A1 | 5/2007 | Sun | |
| 2007/0146454 | A1 | 6/2007 | Doi et al. | |
| 2007/0276060 | A1 | 11/2007 | Stancik et al. | |
| 2008/0041269 | A1* | 2/2008 | Bogale et al. | 106/31.27 |
| 2008/0145628 | A1 | 6/2008 | Oyanagi et al. | |
| 2008/0250970 | A1* | 10/2008 | Oyanagi et al. | 106/31.65 |
| 2008/0257211 | A1 | 10/2008 | Oriakhi | |
| 2011/0281089 | A1 | 11/2011 | Hirata et al. | |

FOREIGN PATENT DOCUMENTS

| | | | |
|---|---|---|---|
| EP | 0 776 952 | A2 | 6/1997 |
| JP | 2008174712 | A | 7/2008 |
| WO | 2006-066033 | A1 | 6/2006 |
| WO | 2010-028285 | A1 | 3/2010 |

OTHER PUBLICATIONS

European Search Report, Jul. 25, 2011.

* cited by examiner

*Primary Examiner* — Laura Martin

(74) *Attorney, Agent, or Firm* — Nutter McClennen & Fish LLP; John J. Penny, V.

(57) ABSTRACT

An ink jet recording method includes making a record on a recording medium having micropores using an ink composition containing a glitter pigment. The glitter pigment has an average particle diameter in the range of 1 nm to 100 nm, inclusive, and the recording medium has an average micropore diameter in the range of 3 nm to 200 nm, inclusive.

5 Claims, No Drawings

INK JET RECORDING METHOD, AND RECORD MADE BY THE SAME

Priority is claimed under 35 U.S.C. §119 to Japanese Application No. 2010-111822 filed on May 14, 2010 and Application No. 2011-023012 filed on Feb. 4, 2011, which is hereby incorporated by reference in its entirety.

BACKGROUND

1. Technical Field

The present invention relates to an ink jet recording method and to records made by the method.

2. Related Art

Glossy coatings can be made on a print by several methods, for example, by printing with an ink containing golden brass powder, silvery aluminum fine particles, or any other powdery material, by stamping with metallic foil, or by thermal transfer with metallic foil.

However, coatings of an ink containing golden or silvery powder are relatively matt colours and hardly have specular gloss because the particle diameter of the metallic powder is as large as 10 μm to 30 μm. Stamping or thermal transfer with metallic foil, in which a printing medium is coated with an adhesive, a flat and smooth sheet of metallic foil is pressed onto the medium, and then the medium and the sheet are heat-sealed, admittedly provides relatively high gloss but on the other hand includes many steps involving the use of pressure or heat; thus, these methods can be performed only with media resistant to heat and deformation.

Ink jet printing has recently been used in a wide variety of applications, for example, metallic printing. For example, JP-A-2008-174712 has proposed a dispersion and an ink composition containing flat-plate aluminum particles.

Unfortunately, aluminum particles for ink jet printing need be made resistant to water and weather in advance to ensure the gloss of the resultant prints and for other purposes. Worse yet, large aluminum particles for improved gloss may be lacking in rubbing fastness on the resultant prints and in dispersion stability in an ink composition.

To solve these problems, the present inventors have conducted extensive research on the use of glitter pigments, which are highly stable chemicals, in forming glossy images by ink jet printing, and found that glitter pigments having a certain particle diameter can exist in ink in a stable dispersion state and give the images formed therewith both high gloss and high fastness to rubbing.

SUMMARY

An advantage of some aspects of the invention is to make it possible to form an image on a recording medium while providing the image with high gloss and high fastness to rubbing.

The following are some aspects and applications of the invention.

Application 1

An aspect of the invention is an ink jet recording method including making a record on a recording medium having micropores using an ink composition containing a glitter pigment. The glitter pigment has an average particle diameter in the range of 1 nm to 100 nm, inclusive. The recording medium has an average micropore diameter in the range of 3 nm to 200 nm, inclusive.

The ink jet recording method according to this application makes it possible to record an image on a recording medium while providing the image with high gloss and high fastness to rubbing.

The average particle diameter of a glitter pigment mentioned in this specification is the volume average particle diameter. A typical method for measuring a volume average particle diameter is analysis in a laser diffraction particle analyzer based on dynamic light scattering.

Application 2

In Application 1, the average micropore diameter of the recording medium can be in the range of 18 nm to 100 nm, inclusive.

The ink jet recording method according to this application further improves the gloss and rubbing fastness of the formed image.

Application 3

In Application 1 or 2, the average particle diameter of the glitter pigment can be in the range of 3 nm to 80 nm, inclusive.

Application 4

In any one of Applications 1 to 3, the ratio of the average micropore diameter of the recording medium to the average particle diameter of the glitter pigment can be in the range of 0.01 to 10, inclusive.

The ink jet recording method according to this application also further improves the gloss and rubbing fastness of the formed image.

Application 5

In any one of Applications 1 to 4, the ratio of the average micropore diameter of the recording medium to the average particle diameter of the glitter pigment can be in the range of 0.1 to 5, inclusive.

Application 6

In any one of Applications 1 to 5, the ratio of the average micropore diameter of the recording medium to the average particle diameter of the glitter pigment can be in the range of 1 to 5, inclusive.

Application 7

Another aspect of the invention is a record made by the ink jet recording method according to any one of Applications 1 to 6.

The record according to this application has an image of high gloss and high fastness to rubbing.

Application 8

Yet another aspect of the invention is also a record, which is made by the ink jet recording method according to any one of Applications 1 to 6 and has an image having a specular glossiness of 200 or higher when measured as directed in Japanese Industrial Standard (JIS) Z 8741 (1997).

The record according to this application also has an image of high gloss and high fastness to rubbing.

DESCRIPTION OF EXEMPLARY EMBODIMENTS

The following describes an embodiment of the invention. This embodiment is just for the purpose of illustrating the invention. The invention is never limited to this embodiment, and various modifications are allowed unless they depart from the gist of the invention. Note that not all the components described below are essential for the invention.

1. Ink Composition

An ink composition used in this embodiment contains a glitter pigment.

1.1. Glitter Pigment

In this embodiment, any kind of glitter pigment may be contained in the ink composition as long as it will have gloss on a medium. Examples of appropriate glitter pigments include the following: aluminum, silver, gold, platinum, nickel, chromium, tin, zinc, indium, titanium, and copper; alloys of two or more of these metals; and pearly pigments.

Typical examples of pearly pigments include titanium-dioxide-coated mica, argentine, bismuth trichloride, and other pigments having gloss like a pearl or gloss brought about by interference. The glitter pigment may be surface-treated to be nonreactive with water. Containing such a glitter pigment, the ink composition can form an image having high gloss.

Preferably, the glitter pigment is silver or aluminum. These metals have a higher degree of whiteness than others, and their combination use with an ink of any other colour provides various metallic colours including gold and copper.

The glitter pigment has an average particle diameter R1 in the range of 1 nm to 100 nm, inclusive. When R1 falls within this range, the glitter pigment will have high gloss on a recording medium. Furthermore, R1 falling within the range of 1 nm to 100 nm, inclusive, makes it easy to adjust the ratio of the average micropore diameter R2 of a commonly used recording medium to R1 (hereinafter, sometimes simply referred to as the ratio of R2 to R1 or R2/R1) and allows the recorded image to have, besides gloss, high rubbing fastness on the medium.

Preferably, R1 is in the range of 3 nm to 80 nm, inclusive. R1 falling within the range of 3 nm to 80 nm, inclusive, allows the formed image to have further improved gloss and rubbing fastness, and the image will give a sense of luxury. Furthermore, this constitution makes the ink composition highly stable during discharge by ink jet printing, or more specifically significantly improves several characteristics of the ink composition such as the positional accuracy of discharge and the consistency of discharge volume. As a result, the ink composition can produce images of desired quality for a long period of time.

As mentioned above, the average particle diameter mentioned in this specification is the volume average particle diameter unless otherwise specified. A typical method for measuring a volume average particle diameter is analysis in a laser diffraction/scattering particle analyzer. Examples of appropriate laser diffraction/scattering particle analyzers include those based on dynamic light scattering, such as Microtrac UPA and Nanotrac UPA (Nikkiso Co., Ltd.).

The gloss mentioned in this specification represents an attribute of a recorded image measured as a specular glossiness (a measure of gloss defined in JIS Z 8741) or any other appropriate measure. The gloss includes mirror-like light-reflecting gloss and so-called flat gloss. These different kinds of gloss can be distinguished by their specular glossiness or any other appropriate measure.

The content of the glitter pigment in the ink composition is preferably in the range of 0.5 mass % to 30 mass %, inclusive, and more preferably 5.0 mass % to 15 mass %, inclusive. A glitter pigment content falling within either or both of these ranges makes the ink composition highly stable during discharge by ink jet printing and highly durable. When the glitter pigment content falls within either or both of the ranges, furthermore, the recorded image will be of high quality (gloss) and high fastness to rubbing regardless of the density (amount per unit area) of the pigment on the print. This means that prints made using the ink composition will be of high quality even in the case of unevenness in the density of the glitter pigment.

The following describes silver particles, a kind of glitter pigment preferred in this embodiment. When the ink composition for this embodiment contains silver particles as the glitter pigment, a typical form of the silver particles is water dispersion. However, the form of the silver particles is not limited to water dispersion; they may be used in a powder form as long as the powder is sufficiently dispersible.

A water dispersion of silver particles contains silver particles and water. The silver particles contained in a water dispersion for this embodiment are mainly composed of silver, but may further contain other substances, including other metals, oxygen, and carbon. In a typical constitution, the purity of the silver particles is 50% or higher on a silver content basis. The silver particles may contain an alloy of silver and any other metal or metals. And, in the water dispersion, the silver particles may exist in a colloidal form (a particle colloid). A colloid of silver particles is more dispersible than other forms and thus advantageous in several ways; for example, it will make the water dispersion and the resultant ink composition highly durable.

The following is a process for preparing a water dispersion of silver particles. Although this process is for preparing a silver colloid water dispersion, other forms of silver particles may also be used in this embodiment.

This process includes the following: preparing a first solution containing at least a vinyl pyrrolidone polymer and a polyhydric alcohol; preparing a second solution containing a silver precursor that can be chemically reduced to metallic silver; heating the first solution to a certain temperature; mixing the heated first solution with the second solution to obtain a mixed solution; leaving the mixed solution at a certain temperature for a certain period of time to let chemical reaction proceed; and then, after the reaction proceeds to some extent, transferring the silver particles (in a colloidal form) from the mixed solution to an aqueous dispersion medium.

First, the first solution, which contains at least a vinyl pyrrolidone polymer and a polyhydric alcohol, is prepared.

The vinyl pyrrolidone polymer contained in the first solution may have several roles, but one of its roles is to be adsorbed on the surface of silver particles, which will be obtained in the later step of this process, to prevent the aggregation of the silver particles and thereby ensure the formation of a silver colloid.

The vinyl pyrrolidone polymer used here includes the homopolymer (polyvinyl pyrrolidone) and copolymers containing vinyl pyrrolidone. Examples of copolymers containing vinyl pyrrolidone include vinyl pyrrolidone-α-olefin copolymers, vinyl pyrrolidone-vinyl acetate copolymers, vinyl pyrrolidone-dimethylaminoethyl (meth)acrylate copolymers, vinyl pyrrolidone-(meth)acrylamidopropyltrimethylammonium chloride copolymers, vinyl pyrrolidone-vinylcaprolactam dimethylaminoethyl (meth)acrylate copolymers, vinyl pyrrolidone-styrene copolymers, and vinyl pyrrolidone-(meth)acrylic acid copolymers.

When polyvinyl pyrrolidone is used as the vinyl pyrrolidone polymer, its weight average molecular weight is preferably in the range of 3000 to 60000, inclusive.

The polyhydric alcohol chemically reduces the silver precursor contained in the second solution to metallic silver. Examples of appropriate polyhydric alcohols include ethylene glycol, propylene glycol, butylene glycol, diethylene glycol, triethylene glycol, tetraethylene glycol, dipropylene glycol, tripropylene glycol, 1,3-propanediol, 1,2-butanediol, 2,3-butanediol, 1,3-butanediol, 1,4-butanediol, glycerol, trimethylolpropane, pentaerythritol, triethanolamine, and tris(hydroxymethyl)aminomethane.

The vinyl pyrrolidone polymer is dissolved in the polyhydric alcohol to provide the first solution. Besides the polyhydric alcohol, the first solution may further contain a reducing agent for chemically reducing the silver precursor contained in the second solution. Examples of appropriate reducing agents include the following: hydrazine and its derivatives; hydroxylamine and its derivatives; methanol, ethanol, and other monohydric alcohols; formaldehyde, formic acid, acetaldehyde, propionaldehyde, their ammonium salts, and other aldehydes; hypophosphites; sulfites; tetrahydroborates (e.g., lithium [Li], sodium [Na], and potassium [K] tetrahydroborates); lithium aluminum hydride ($LiAlH_4$); sodium borohydride ($NaBH_4$); hydroquinone, alkylated hydroquinones, catechol, pyrogallol, and other polyhydroxybenzenes; phenylenediamine and its derivatives; aminophenol and its derivatives; ascorbic acid, citric acid, ascorbic acid ketals, and other carboxylic acids and their derivatives; 3-pyrazolidone and its derivatives; hydroxytetronic acid, hydroxytetronamides, and their derivatives; bis-naphthols and their derivatives; phenyl sulfonamides and their derivatives; Li, Na, and K. Preferred reducing agents include ammonium formate, formic acid, formaldehyde, acetaldehyde, propionaldehyde, ascorbic acid, citric acid, sodium borohydride, lithium aluminum hydride, and lithium triethyl borohydride, and more preferred ones include ammonium formate.

Then, the second solution, which contains a silver precursor that can be chemically reduced to metallic silver, is prepared.

The silver precursor used here represents a compound that can be converted into metallic silver through chemical reduction with the polyhydric alcohol and optionally with a reducing agent.

Examples of the silver precursor include silver-containing compounds in the following forms: oxide, hydroxide (including oxide hydrate), nitrate, nitrite, sulfate, halide (e.g., fluoride, chloride, bromide, and iodide), carbonate, phosphate, azide, borate (including fluoroborate and pyrazolylborate), sulfonate, carboxylate (e.g., formate, acetate, propionate, oxalate, and citrate), substituted carboxylate (including those with a halogen, a hydroxy group, and an amino group, such as trifluoroacetate), hexachloroplatinate, tetrachloroaurate, tungstate, and other inorganic and organic acid salts, and alkoxide, complex, and so forth.

Regarding solvent, any kind may be used as long as the silver precursor is soluble in it. Examples of appropriate solvents include the above-listed polyhydric alcohols appropriate for use in the first solution as well as aliphatic, alicyclic, and aromatic alcohols, ether alcohols, and amino alcohols.

The silver precursor is dissolved in the solvent to provide the second solution.

Then, the first solution is heated, and the first and second solutions are mixed and allowed to react with each other under heat.

The temperature of the first solution at mixing is preferably in the range of 100° C. to 140° C., inclusive, more preferably 101° C. to 130° C., inclusive, and much more preferably 115° C. to 125° C., inclusive. These conditions allow the silver precursor to be efficiently reduced and the vinyl pyrrolidone polymer to be efficiently adsorbed on the surface of the resultant silver particles. The mixed solution is heated for a certain period of time to let the reduction reaction of the silver precursor proceed. Depending on the heating temperature, the heating time (reaction time) is preferably in the range of 30 minutes to 180 minutes, inclusive, more preferably 30 minutes to 120 minutes, inclusive, and much more preferably 60 minutes to 120 minutes, inclusive. These conditions help to reduce the silver precursor completely and to get the vinyl pyrrolidone polymer effectively adsorbed on the surface of the resultant silver particles.

The obtained silver particles (silver colloid) are then isolated by filtration, centrifugation, or any other appropriate technique, and dispersed in an aqueous dispersion medium at a desired concentration. In this way, the silver particles and the silver colloid water dispersion are obtained. A water dispersion containing the silver particles not in a colloidal form can also be obtained in a similar way.

The water dispersion of silver particles may contain substances other than those described above. For example, it may contain residues of the compounds used in the preparation process, or more specifically alcohol, a dispersant, a reducing agent, salt, phenol, amine, and/or any kind of polymer. Hereinafter, these substances are sometimes collectively referred to as solid matter, in the sense that they are not water.

When silver particles are chosen as the glitter pigment for the ink composition for this embodiment, the water dispersion of silver particles prepared as above can be suitably used as a raw material. This water dispersion of silver particles, which contains an aqueous solvent, can be easily used to make the ink composition. In addition, the ink composition may contain two or more kinds of glitter pigments.

1.2. Water

The ink composition can contain water. The water used in the ink composition may be purified water including ion-exchanged water, ultrafiltered water, reverse-osmosis-purified water, distilled water, and ultrapure water. The water may contain ions or other kinds of modifiers and/or impurities in such amounts that they do not inhibit the glitter pigment from dispersing.

When the ink composition contains water, the water may be at any content unless it inhibits the glitter pigment from dispersing; however, preferably, the water content is in the range of 50 mass % to 95 mass %, inclusive, relative to the total mass of the ink composition. A water content in the ink composition falling within this range leads to further improved dispersibility and storage stability of the glitter pigment. When the water dispersion of silver particles described above is used to add silver particles (a glitter pigment) to the ink composition, the water content in the ink composition includes that from the water dispersion of silver particles and that from water added as necessary.

Incidentally, the water content being in the range of 50 mass % to 95 mass %, inclusive, means that the content of the substances other than water is in the range of 5 mass % to 50 mass %, inclusive. As mentioned above, in this specification, substances other than water are sometimes collectively referred to as solid matter. The water content being in the range of 50 mass % to 95 mass %, inclusive, therefore means that the solid matter content in the ink composition is in the range of 5 mass % to 50 mass %, inclusive.

1.3. Other Ingredients

Besides the glitter pigment described above, the ink composition can further contain a surfactant, polyhydric alcohol, a pH adjusting agent, resin, colouring material, and/or other additives, if necessary.

Examples of appropriate surfactants include those based on acetylene glycol or polysiloxane. These types of surfactants will help the ink composition wet and penetrate into the image formation surface (the surface to which the ink composition is applied) of a recording medium. Examples of appropriate acetylene glycol surfactants include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. Commercially available acetylene glycol surfactants can also be used, including OLFINE E1010, STG, and Y (Nissin Chemical Co., Ltd.), and Surfynol 104, 82, 465, 485, and TG (Air Products and Chemicals, Inc.). Examples of appropriate polysiloxane surfactants include the products commercially available under the trade names of BYK-347 and BYK-348 (BYK Japan KK) and so forth. Other kinds of surfactants, such as anionic, nonionic, and amphoteric ones, can also be used.

As for the polyhydric alcohol, examples of appropriate ones include ethylene glycol, diethylene glycol, triethylene glycol, polyethylene glycol, polypropylene glycol, propylene glycol, and butylene glycol, 1,2-alkanediols having four to eight carbon atoms, such as 1,2-butanediol, 1,2-pentanediol, 1,2-hexanediol, 1,2-heptanediol, and 1,2-octanediol, and 1,2,6-hexanetriol, thioglycol, hexylene glycol, glycerol, trimethylolethane, and trimethylolpropane. These kinds of polyhydric alcohols will make the ink composition slower to dry; an ink jet recording apparatus used with such a slow-to-dry ink composition will be prevented from getting clogged with dried ink at its ink jet recording head.

Among others, 1,2-alkanediols are particularly preferable because they can help a lot the ink composition wet and penetrate into the image formation surface of a recording medium. In particular, 1,2-alkanediols having six to eight carbon atoms, or more specifically 1,2-hexanediol, 1,2-heptanediol, and 1,2-octanediol, can penetrate into a recording medium much more quickly than others.

As for the pH adjusting agent, any kind can be used with no particular limitations. Examples of appropriate pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

As for the resin, examples of appropriate kinds include the homopolymer of acrylic acid, acrylates, methacrylic acid, methacrylates, acrylonitrile, cyanoacrylate, acrylamide, olefins, styrene, vinyl acetate, vinyl chloride, vinyl alcohol, vinyl ether, vinyl pyrrolidone, vinyl pyridine, vinyl carbazole, vinyl imidazole, and vinylidene chloride, copolymers of two or more of them, and urethane resins, fluorocarbon resins, and natural resins. When any kind of copolymer is used as the resin, it may be a random copolymer, a block copolymer, an alternating copolymer, or a graft copolymer. These kinds of resins help to fix the glitter pigment firmly to a recording medium.

As for the colouring material, examples of appropriate kinds include pigments and dyes with no gloss. Colouring materials for ordinary ink can all be used with no particular limitations. An advantage of adding colouring material to the ink composition is that the ink composition becomes able to provide the image formed on a recording medium not only with gloss but also with a colour.

Examples of dyes appropriate for use in the ink composition include direct dyes, acid dyes, food dyes, basic dyes, reactive dyes, disperse dyes, vat dyes, soluble vat dyes, reactive disperse dyes, and all other dyes commonly used in ink jet recording.

On the other hand, examples of pigments appropriate for use in the ink composition include inorganic and organic pigments.

Examples of appropriate inorganic pigments include carbon blacks. On the other hand, examples of appropriate organic pigments include azo pigments, polycyclic pigments, dye chelate, nitro pigments, nitroso pigments, and aniline blacks. When any pigment other than the glitter pigment is used, its colour is typically black, yellow, magenta, or cyan. Several ink compositions prepared as above can contain colouring materials of different colours, for example, yellow, magenta, cyan, and black as four primary colours and their darker and/or lighter colours as additional colours. In a possible constitution, the colours of several ink compositions are as follows: magenta, and light magenta and red as its lighter and darker colours; cyan, and light cyan and blue as its lighter and darker colours; black, and gray, light black, and matt black as its lighter and darker colours.

When the ink composition contains any pigment other than the glitter pigment, the average particle diameter of the additional pigment is preferably in the range of 10 to 200 nm and more preferably in the range of about 50 to about 150 nm. When the ink composition contains colouring material, the content of the colouring material is preferably in the range of about 0.1 to about 25 mass % and more preferably about 0.5 to about 15 mass %.

When the ink composition contains any pigment other than the glitter pigment, a dispersant for dispersing this additional pigment can be added. Examples of preferred dispersants include those commonly used to prepare pigment dispersions, such as polymer dispersants, and all dispersants for ordinary ink. When the ink composition contains such a dispersant, the appropriate content of the dispersant depends on the kind of the colouring material chosen; however, the dispersant content is usually in the range of 5 to 200 mass % and more preferably 30 to 120 mass % relative to the content of the colouring material in the ink composition.

In addition to these, the ink composition can contain one or more additives including a fixative such as water-soluble rosin, a fungicide or preservative such as sodium benzoate, an antioxidant such as an allophanate, a wetting agent, an ultraviolet absorber, a chelating agent, and an oxygen absorber.

1.4. Operations and Advantages

The ink composition can be applied to a recording medium by discharging from an ink jet recording apparatus. Once the ink composition adheres to the recording medium, it provides high gloss.

The use of the ink composition is not particularly limited; it can be used with writing tools, stamps, recorders, pen plotters, ink jet recording apparatuses, and so forth. When the ink composition is used in printing by ink jet recording, its viscosity at 20° C. is preferably in the range of 2 to 10 mPa·s and more preferably 3 to 5 mPa·s. When with the viscosity at 20° C. within either or both of these ranges, the ink composition can be discharged from the nozzles in an appropriate amount and thus will be effectively prevented from travelling in random directions and spattering; such an ink composition is suitable for use in an ink jet recording apparatus.

2. Ink Jet Recording Method

The ink jet recording method according to this embodiment includes discharging the ink composition described above through an ink jet recording head onto a recording medium having micropores on its image formation surface. The ratio of the average micropore diameter R2 of the recording medium to the average particle diameter R1 of the glitter pigment contained in the ink composition, namely the ratio of R2 to R1, is in the range of 0.1 to 5, inclusive. The following illustrates a process by which the ink composition is discharged from an ink jet recording apparatus onto a recording medium to form a group of dots.

2.1. Ink Jet Recording Head

Operating principles of ink jet recording apparatuses include electrostatic suction printing, printing by mechanical oscillations, piezoelectric printing, and thermal jet printing. In electrostatic suction printing, a strong electric field is applied between nozzles and accelerating electrodes situated in front of the nozzles, ink droplets are continuously ejected from the nozzles, and the ink droplets travel to a recording medium through between deflecting electrodes, to which printing information signals are transmitted during the travel of the ink droplets; in some constitutions, however, the ink droplets are ejected in response to printing information signals without being deflected. In printing by mechanical oscillations, a small pump pressurizes the ink solution, and then quartz resonators or any other mechanical oscillation units make the nozzles oscillate; as a result, ink droplets are forcedly ejected. In piezoelectric printing, piezoelectric elements supply the ink solution with pressure and printing information signals at the same time, and thereby ink droplets are ejected and make a record. In thermal jet printing, microelectrodes heat the ink solution in response to printing information signals to make it bubble, and thereby ink droplets are ejected and make a record.

Examples of ink jet recording apparatuses that can be used in this embodiment include ones having an ink jet recording head, a main body, a tray, a head-driving mechanism, a carriage, and other components, the ink jet recording head working on any of the operating principles described above or similar. The ink jet recording head can have several ink cartridges accommodating an ink set of four (e.g., cyan, magenta, yellow, and black) or more colours to support full-colour printing. In this embodiment, at least one of such ink cartridges is loaded with the ink composition described above. The remaining cartridges, if any, may be loaded with ordinary inks or the like. Besides these components, this type of ink jet recording apparatus has an exclusive control board and related units, with which the apparatus can control the timings of the ink ejection from the ink jet recording head and the operation of the head-driving mechanism.

2.2. Recording Medium

Recording media that can be used in this embodiment are ones to which droplets of the ink composition can be applied using an ink jet recording apparatus and that have micropores on its image formation surface.

The micropores are defined as pores or depressions seen on microscopic images of the image formation surface of the recording medium, such as scanning electron microscopy (SEM) images. The pores include those extending deep inside the recording medium (holes), and the depressions include those naturally occurring on the recording medium as surface roughness. When the image formation surface of the recording medium is observed by SEM, the diameter (circle-equivalent diameter) of the micropores is typically in the range of 1 nm to 1 μm, inclusive.

Any kind of recording medium may be used as long as its image formation surface has such micropores. Examples of recording media that can be used in the ink jet recording method according to this embodiment include paper, porous films, fabrics, and other kinds of absorbent recording media. Recording media based on plastic or any other non-absorbent material can also be used after an ink-absorbing layer is formed on the image formation surface. An ink-absorbing layer for this purpose can be made of silica, colloidal silica, alumina, a polymer material, or any similar material. Examples of polymer materials appropriate for the use as the main ingredient of such an ink-absorbing layer include polyvinyl alcohol, polyvinyl pyrrolidone, starch, water-soluble cellulose derivatives, acrylic silicone resins, and urethane resins.

The recording medium may be a glossy one, a matt one, or a dull one. Specific examples of recording media that can be used in the ink jet recording method according to this embodiment include surface-treated papers such as coated paper, art paper, and cast-coated paper, and plastic films such as polyvinyl chloride sheets and polyethylene terephthalate (PET) films, although plastic films should be covered with an ink-absorbing layer before use.

The average micropore diameter R2 of the recording medium can be determined by several methods, for example, by measuring the diameter (circle-equivalent diameter) of the pores or depressions on an SEM image of the image formation surface. More specifically, it can be determined in the following way: taking an SEM image containing at least 20 micropores in the field of view; choosing 20 micropores at random; determining the outlines (contours) of the micropores on the SEM image with the median of the contrasts around the micropores as the threshold; measuring the areas inside the contours; calculating the diameter or circle-equivalent diameter of each micropore from the measured areas; excluding the five largest micropores and the smallest five; arithmetically averaging the diameters of the remaining ten micropores to make an individual micropore diameter; repeating these steps four more times at different points on the same recording medium; and then arithmetically averaging all the individual micropore diameters. In this way, R2 is obtained. The extraction of the contours of micropores from an SEM image, the determination of the median of contrasts, the calculations of the circle-equivalent diameters, and other operations may be performed with a commonly used image processor or the like. Any SEM system can be used for this measurement with no particular limitations; examples of appropriate SEM systems include Hitachi S3600, S4700, S4800, and S5200.

2.3. Size Relationship Between the Micropores of the Recording Medium and the Glitter Pigment In the ink jet recording method according to this embodiment, the glitter pigment contained in the ink composition and the recording medium having micropores are preferably chosen so that the ratio of the average micropore diameter R2 of the recording medium to the average particle diameter R1 of the glitter pigment should be in the range of 0.01 to 10, inclusive ($0.01 \leq R2/R1 \leq 10$). This ensures that the recorded image has high gloss and high fastness to rubbing. Choosing the glitter pigment and the recording medium so that the ratio of R2 to R1 should be in the range of 0.1 to 5, inclusive ($0.1 \leq R2/R1 \leq 5$) will lead to further improved rubbing fastness of the recorded image. Much more preferably, the ratio of R2 to R1 is in the range of 1 to 5 ($1 \leq R2/R1 \leq 5$).

In the ink jet recording method according to this embodiment, an appropriate combination of a glitter pigment and a recording medium can be identified by searching for a recording medium having R2 that meets at least one of the ranges specified above with a fixed glitter pigment having a certain average particle diameter R1, or by searching for a glitter pigment having R1 that meets at least one of the ranges specified above with a fixed recording medium having a certain average micropore diameter R2.

R2 of the recording medium can be adjusted by several ways, for example, by forming certain kind and grade of an ink-absorbing layer on the recording medium. Also, R1 of the glitter pigment can be adjusted by several ways, for example, by choosing an appropriate commercial product or, when the glitter pigment is based on silver particles, by preparing a water dispersion of the silver particles under appropriate conditions.

Recording media having R2 in the range of 3 nm to 200 nm, inclusive, can be used in the ink jet recording method according to this embodiment. Preferably, R2 is in the range of 18 nm to 100 nm, inclusive. Recording media satisfying either or both of these conditions will give an image formed thereon further improved gloss and rubbing fastness.

A reason for this improvement of gloss and rubbing fastness is probably the fact that the ratio of R2 to R1 falls within an appropriate range. More specifically, the glitter pigment has a particle size distribution, and relatively small particles of the glitter pigment can get adsorbed on the recording medium by being caught in the micropores, plugging the micropores, or other ways, contributing to the surface flatness of the resultant image and the adhesion of the image to the recording medium. It is therefore thought that in the ink jet recording method according to this embodiment, a proper size balance between the glitter pigment and the micropores makes some contribution. In particular, a ratio of R2 to R1 falling within the range of 0.01 to 10, inclusive ($0.01 \leq R2/R1 \leq 10$), is expected to lead to further improved surface flatness of the resultant image and further improved adhesion of the image to the recording medium.

The gloss of an image formed on a recording medium can be quantified by the method specified in JIS Z 8741 (1997) (Specular glossiness-Methods of measurement). A more specific way to determine this glossiness is as follows: irradiating a test specimen with light from angles of incidence of 20°, 45°, 60°, 75°, and 85°; measuring the intensity of light with photodetectors situated at angles of reflection; and then calculating the glossiness from the intensity measurements. Examples of analyzers supporting this kind of measurement include Multi Gloss 268 (Konica Minolta Sensing, Inc.) and Gloss Meter VGP5000 (Nippon Denshoku Industries Co., Ltd.). The specular glossiness measured as directed in JIS Z8741 (1997) is preferably 200 or higher, more preferably 300 or higher, much more preferably 400 or higher, and the most preferably 500 or higher.

On the other hand, the rubbing fastness of an image formed on a recording medium can be evaluated by several methods, for example, by rubbing the recording medium on its image formation surface with nails or fingers and observing for changes or some modifications of the method specified in JIS L 0801 (1995) (General principles of testing methods for colour fastness).

3. Experiments

The following further details the invention with reference to experiments. The invention is never limited to these experiments.

3.1. Glitter Pigment

In all the experiments, the ink composition contained silver particles as the glitter pigment. Two kinds of water dispersions of silver particles were prepared and used with the names of Silver Particle Water Dispersion A and Silver Particle Water Dispersion B. In accordance with the preparation process described above, these two dispersions were prepared as follows.

First, polyvinyl pyrrolidone (PVP; weight average molecular weight: 10000) was heated at 70° C. for 15 hours, and then allowed to cool at room temperature. Subsequently, 1000 g of the PVP was added to 500 mL of ethylene glycol solution to provide a PVP solution. Separately, 128 g of silver nitrate was added to 500 mL of ethylene glycol, and the components were thoroughly mixed on an electromagnetic stirrer to provide a silver nitrate solution. While the PVP solution was being stirred at 120° C. with an overhead mixer, the silver nitrate solution was added. The obtained mixture was heated for approximately 80 minutes to undergo reaction, and then allowed to cool at room temperature. The obtained solution was centrifuged at 2200 rpm for 10 minutes. The isolated silver particles were taken out and added to 500 mL of ethanol solution in order for any excess PVP to be removed. Another round of centrifugation was performed to isolate the remaining silver particles. Subsequently, all the collected silver particles were dried in a vacuum oven maintained at 35° C. and 1.3 Pa. The dried silver particles were reconstituted in purified water by stirring for 3 hours. In this way, Silver Particle Water Dispersion A was prepared. The solid content of this dispersion was 20%.

Silver Particle Water Dispersion B was prepared in the same way except that the time of heating for reaction was approximately 10 hours.

3.2. Ink Composition

In each experiment, the ink composition was prepared from Silver Particle Water Dispersion A or B. More specifically, each ink composition contained the silver particle water dispersion at 10 mass %, glycerin at 10 mass %, trimethylolpropane at 5 mass %, 1,2-hexanediol at 3 mass %, a polysiloxane surfactant (BYK-348 from BYK Japan KK) at 1 mass %, triethanolamine at 3 mass %, and ion-exchanged water as the balance at 68 mass %, and these components were combined and thoroughly mixed to provide the ink composition. Silver Particle Water Dispersion A was used in the ink compositions for Experiments 1 to 10, and B was used in the ink compositions for Experiments 11 to 20.

In all the experiments, the average particle diameter of the silver particles contained in the ink composition was measured. In the experiments with Silver Particle Water Dispersion A, namely Experiments 1 to 10, the average particle diameter of silver particles was 20 nm. As for Experiments 11 to 20, in which Silver Particle Water Dispersion B was used, the average particle diameter of silver particles was 50 nm. This measurement of the average particle diameter of silver particles was performed in Microtrac UPA (Nikkiso Co., Ltd.) with the refractive index set at 0.2-3.9i, the refractive index of solvent (water) at 1.333, and the shape of particles as spheres.

TABLE 1

| | | Test specimen | | | | | | | | |
|---|---|---|---|---|---|---|---|---|---|---|
| | | Recording medium | | | | Ink composition | | Evaluation results | | |
| | | Colloidal silica applied | | | | | | | | |
| | | SNOWTEX Product No. | Ave. primary particle dia. (nm) | Glossiness at 60° | R2 (nm) | R1 (nm) | R2/R1 | Glossiness at 60° | Gloss grade | Rubbing fastness grade |
| Experiment No. | 1 | — | — | 58 | 0 | 20 | 0 | 383 | A | D |
| | 2 | XS | 4 to 6 | 55 | 3 | 20 | 0.15 | 551 | S | C |
| | 3 | OS | 8 to 11 | 50 | 7 | 20 | 0.35 | 544 | S | C |
| | 4 | 20 | 10 to 20 | 47 | 16 | 20 | 0.8 | 542 | S | C |
| | 5 | CM | 20 to 30 | 42 | 20 | 20 | 1 | 530 | S | B |
| | 6 | 20L | 40 to 50 | 41 | 44 | 20 | 2.2 | 386 | A | B |
| | 7 | XL | 40 to 60 | 35 | 52 | 20 | 2.6 | 356 | A | B |
| | 8 | ZL | 70 to 100 | 32 | 87 | 20 | 4.35 | 221 | B | B |
| | 9 | MP-2040 | 200 | 22 | 198 | 20 | 9.9 | 88 | C | A |

TABLE 1-continued

| | Test specimen | | | | | | | | | |
|---|---|---|---|---|---|---|---|---|---|---|
| | Recording medium | | | | Ink composition | | Evaluation results | | | |
| | Colloidal silica applied | | | | | | | | | Rubbing |
| | SNOWTEX Product No. | Ave. primary particle dia. (nm) | Glossiness at 60° | R2 (nm) | R1 (nm) | R2/R1 | Glossiness at 60° | Gloss grade | fastness grade |
| 10 | MP-4540M | 450 | 21 | 461 | 20 | 23.05 | 23 | D | A |
| 11 | — | — | 58 | 0 | 50 | 0 | 392 | A | D |
| 12 | XS | 4 to 6 | 55 | 3 | 50 | 0.06 | 527 | S | C |
| 13 | OS | 8 to 11 | 50 | 7 | 50 | 0.14 | 524 | S | C |
| 14 | 20 | 10 to 20 | 47 | 16 | 50 | 0.32 | 523 | S | C |
| 15 | CM | 20 to 30 | 42 | 20 | 50 | 0.4 | 521 | S | C |
| 16 | 20L | 40 to 50 | 41 | 44 | 50 | 0.88 | 517 | S | C |
| 17 | XL | 40 to 60 | 35 | 52 | 50 | 1.04 | 511 | S | B |
| 18 | ZL | 70 to 100 | 32 | 87 | 50 | 1.74 | 359 | A | B |
| 19 | MP-2040 | 200 | 22 | 198 | 50 | 3.96 | 232 | B | B |
| 20 | MP-4540M | 450 | 21 | 461 | 50 | 9.22 | 84 | C | A |

3.3. Recording Medium

Recording media having different average micropore diameters on the image formation surface were used. Each recording medium was prepared by applying a coating solution to one side of resin-coated paper (the side of titanium-oxide-containing resin) with a bar coater and then drying the coating. The dry thickness of the coating had been set at 38 μm. The resin-coated paper and the coating solution were prepared in advance as follows.

The preparation process of the resin-coated paper was as follows. Base paper was coated on one side (the side for forming an ink-absorbing layer) with a resin composition, with the dry thickness of the coating set at 30 μm. The base paper was composed of leaf bleached kraft pulp LBKP (hardwood, 50 parts) and leaf bleached sulfite pulp LBSP (hardwood, 50 parts) and had a thickness of 192 μm and a stiffness of 1.26 measured as directed in JIS P 8125. The resin composition was composed of low-density polyethylene (70 parts), high-density polyethylene (20 parts), and titanium oxide (10 parts). The base paper was then coated on the other side (the side not for forming the ink-absorbing layer) with another resin composition, with the dry thickness of the coating set at 34 μm. This resin composition was composed of high-density polyethylene (50 parts) and low-density polyethylene (50 parts).

The coating solution was a solution containing colloidal silica at 60 parts by mass, a binder at 20 parts by mass, a fixative at 4 parts by mass, titanium lactate at 0.2 parts by mass, and water at 200 parts by mass. The colloidal silica was chosen from different types of SNOWTEX (Nissan Chemical Industries, Ltd.; see Table 1 for product numbers). The binder was PVA-217 (Kuraray Co., Ltd.) and had a degree of saponification of 88 mol % and an average degree of polymerization of 1700. The fixative was PAS-A-1 (Nitto Boseki Co., Ltd.). And, the titanium lactate was TC-400 (Matsumoto Pharmaceutical Manufacture Co., Ltd.).

For the product number of colloidal silica used in the recording medium in each experiment, see Table 1. The recording media for Experiments 1 and 11 were used with no coating solution applied. As can be seen from Table 1, different types of colloidal silica had different average primary particle diameters, and the recording media had accordingly different average micropore diameters among the experiments. Table 1 also lists the average primary particle diameter of colloidal silica. For each recording medium, the glossiness was determined using Multi Gloss 268 gloss meter (Konica Minolta Sensing, Inc.) as directed in JIS Z 8741 (1997). Table 1 lists the glossiness of the individual recording media measured at an angle of incidence of 60°.

The average micropore diameter of each recording medium was measured on the image formation surface in the following way. First, the recording media were made conductive by depositing platinum-palladium on the image formation surface to a thickness of approximately 2 nm. The obtained conductive recording media were individually introduced into an SEM (Hitachi S4700), and the image formation surface was imaged. The magnification was adjusted so that each SEM image should have 20 to 40 micropores. On each SEM image, several micropores were chosen, and the average micropore diameter was determined with them. More specifically, the average micropore diameter was determined in the following way: Twenty were randomly chosen from the 20 to 40 micropores; The circle-equivalent diameter was determined for each of the chosen micropores; The largest five micropores and the smallest five were excluded; The circle-equivalent diameters of the remaining ten were arithmetically averaged to provide an individual micropore diameter; These steps were repeated four more times at different points on the same recording medium; Then, all the individual micropore diameters were arithmetically averaged to provide the average micropore diameter. Table 1 also lists the average micropore diameter of the individual recording media.

3.4. Preparation of Test Specimens

In each experiment, a record was made using PX-G930 ink jet printer (Seiko Epson Corp.) as an ink jet recording apparatus. More specifically, in each experiment, the ink composition was loaded into the black ink chamber of the exclusive ink cartridge of this printer, the ink cartridge was mounted in the printer, and then a print was made with the printer.

All test specimens were made under the same printer settings: type of paper: Shashin youshi, kotaku (photographic paper, glossy); colour correction: disabled; image quality: Foto (photographic); resolution: 1440 dpi; printing mode: one-way printing. Under this set of printer settings, uniform solid images were produced with the duty set at 100%.

3.5. Evaluation Methods

The test specimens obtained in the experiments were assessed on gloss and rubbing fastness.

For gloss, the glossiness was determined using Multi Gloss 268 gloss meter (Konica Minolta Sensing, Inc.) as directed in JIS Z 8741 (1997) at angles of incidence of 20°, 60°, and 85°. Table 1 lists the measurements obtained at an angle of incidence of 60°. These measurements of glossiness at an angle of incidence of 60° were graded in accordance with the following criteria: S: ≥500; A: ≥350 to <500; B: ≥200 to <350; C: ≥50 to <200; D: <50. The results are summarized in Table 1.

As for rubbing fastness, it was assessed by rubbing each test specimen with nails and fingers at some points on the image formation surface. The grades and criteria used in this test were as follows: A: No silver particles removed by vigorous rubbing with nails; B: No silver particles removed by rubbing with fingers, but some removed by vigorous rubbing with nails; C: Some silver particles removed by vigorous rubbing with fingers; D: Some silver particles removed by rubbing with fingers. The results are summarized in Table 1.

Table 1 also lists the ratio of the average micropore diameter R2 of the recording medium to the average particle diameter R1 of silver particles (R2/R1).

3.6. Evaluation Results

As can be seen from Table 1, the glossiness increased as the ratio of R2 to R1 (R2/R1) decreased. In contrast to this, the fastness to rubbing increased as R2/R1 increased. The balance between gloss and rubbing fastness was favorable when R2/R1 was in the range of 0.01 to 10, better when R2/R1 was in the range of 0.1 to 5, and excellent when R2/R1 was in the range of 1 to 5. No experiments encountered clogging or other defects of the ink jet printer. These results demonstrated that the ink compositions prepared and used in accordance with an embodiment of the invention were excellent in terms of the dispersibility of the glitter pigment contained therein and provided high gloss and high rubbing fastness on their respective recording media. It was also demonstrated that the ink jet recording method according to an embodiment of the invention can provide an image with high gloss and high rubbing fastness when the ratio of the average micropore diameter R2 of the recording medium to the average particle diameter R1 of silver particles is in the range of 0.01 to 10, inclusive.

The invention is never limited to the embodiment described above, and various modifications are allowed. For example, the invention includes constitutions that are substantially the same as the embodiment described above (e.g., ones that have the same function, are based on the same method, and provide the same results as the embodiment, or ones for the same purposes and advantages as the embodiment). Furthermore, the invention includes constitutions obtained by changing any nonessential part or parts of the embodiment described above. Moreover, the invention includes constitutions having the same operations and offering the same advantages as the embodiment described above and constitutions that can achieve the same purposes as the embodiment described above. Additionally, the invention includes constitutions obtained by adding any known technology or technologies to the embodiment described above.

What is claimed is:

1. A record comprising: an image made by the ink jet image recording method comprising:

making a record comprising an image on a recording medium having micropores using an ink composition containing a glitter pigment, the glitter pigment having an average particle diameter in the range of 1 nm to 100 nm, inclusive, and the recording medium having an average micropore diameter in the range of 3 nm to 200 nm, inclusive, wherein the ratio of the average micropore diameter of the recording medium to the average particle diameter of the glitter pigment is in the range of 0.01 to 10, wherein the record has a specular glossiness of 200 or higher when measured as directed in Japanese Industrial Standard Z 8741 issued in 1997.

2. A record comprising: an image made by the ink jet image recording method comprising:

making a record comprising an image on a recording medium having micropores using an ink composition containing a glitter pigment, the glitter pigment having an average particle diameter in the range of 1 nm to 100 nm, inclusive, and the recording medium having an average micropore diameter in the range of 18 nm to 100 nm, inclusive, wherein the ratio of the average micropore diameter of the recording medium to the average particle diameter of the glitter pigment is in the range of 0.01 to 10, wherein the record has a specular glossiness of 200 or higher when measured as directed in Japanese Industrial Standard Z 8741 issued in 1997.

3. A record comprising: an image made by the ink jet image recording method comprising:

making a record comprising an image on a recording medium having micropores using an ink composition containing a glitter pigment, the glitter pigment having an average particle diameter in the range of 3 nm to 80 nm, inclusive, and the recording medium having an average micropore diameter in the range of 3 nm to 200 nm, inclusive, wherein the ratio of the average micropore diameter of the recording medium to the average particle diameter of the glitter pigment is in the range of 0.01 to 10, wherein the record has a specular glossiness of 200 or higher when measured as directed in Japanese Industrial Standard Z 8741 issued in 1997.

4. A record comprising: an image made by the ink jet image recording method comprising:

making a record comprising an image on a recording medium having micropores using an ink composition containing a glitter pigment, the glitter pigment having an average particle diameter in the range of 1 nm to 100 nm, inclusive, and the recording medium having an average micropore diameter in the range of 3 nm to 200 nm, inclusive, wherein the ratio of the average micropore diameter of the recording medium to the average particle diameter of the glitter pigment is in the range of 0.1 to 5, inclusive, wherein the record has a specular glossiness of 200 or higher when measured as directed in Japanese Industrial Standard Z 8741 issued in 1997.

5. A record comprising: an image made by the ink jet image recording method comprising:

making a record comprising an image on a recording medium having micropores using an ink composition containing a glitter pigment, the glitter pigment having an average particle diameter in the range of 1 nm to 100 nm, inclusive, and the recording medium having an average micropore diameter in the range of 3 nm to 200 nm, inclusive, wherein the ratio of the average micropore diameter of the recording medium to the average particle diameter of the glitter pigment is in the range of 1 to 5, inclusive, wherein the record has a specular glossiness of 200 or higher when measured as directed in Japanese Industrial Standard Z 8741 issued in 1997.

* * * * *